United States Patent Office 3,394,040
Patented July 23, 1968

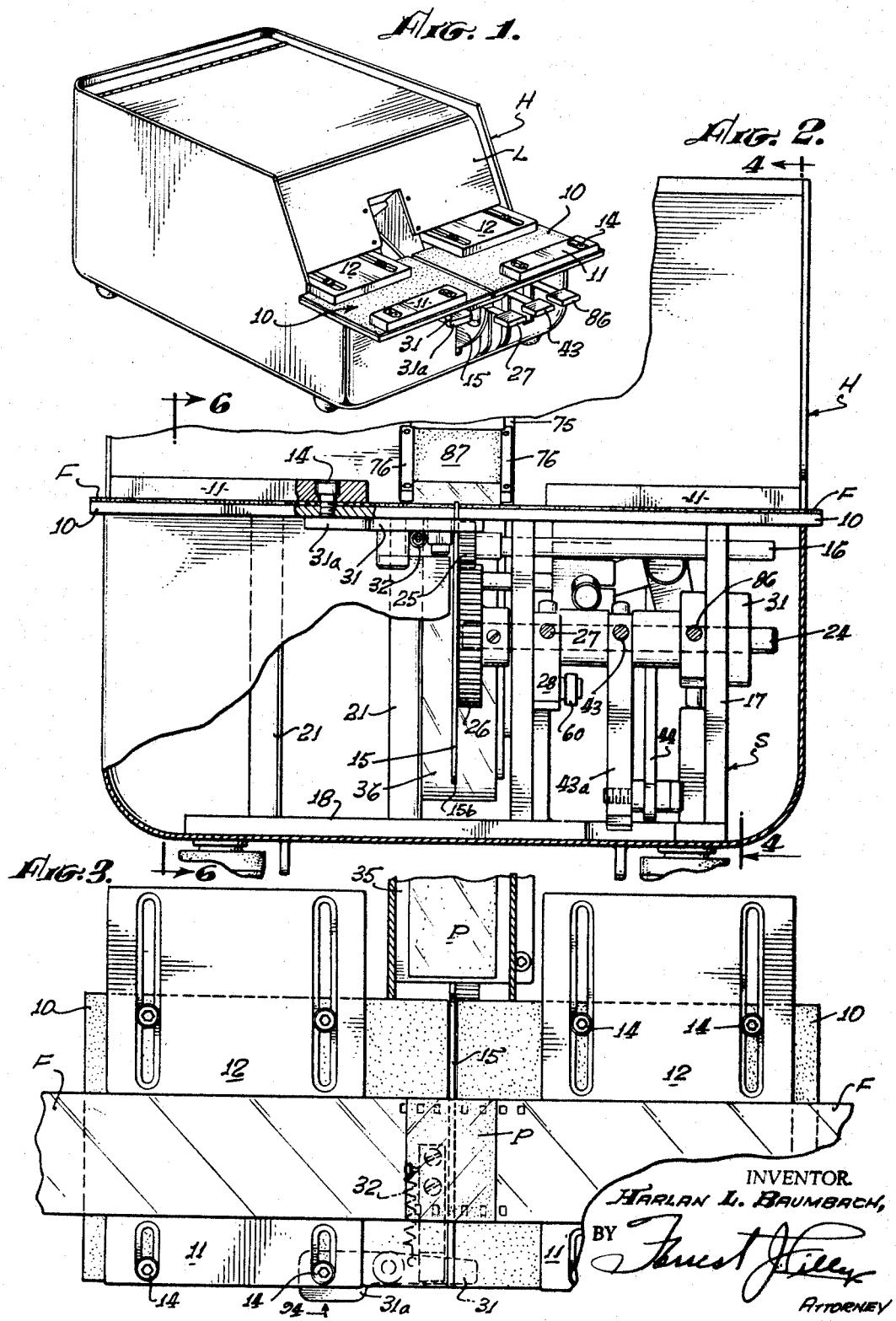

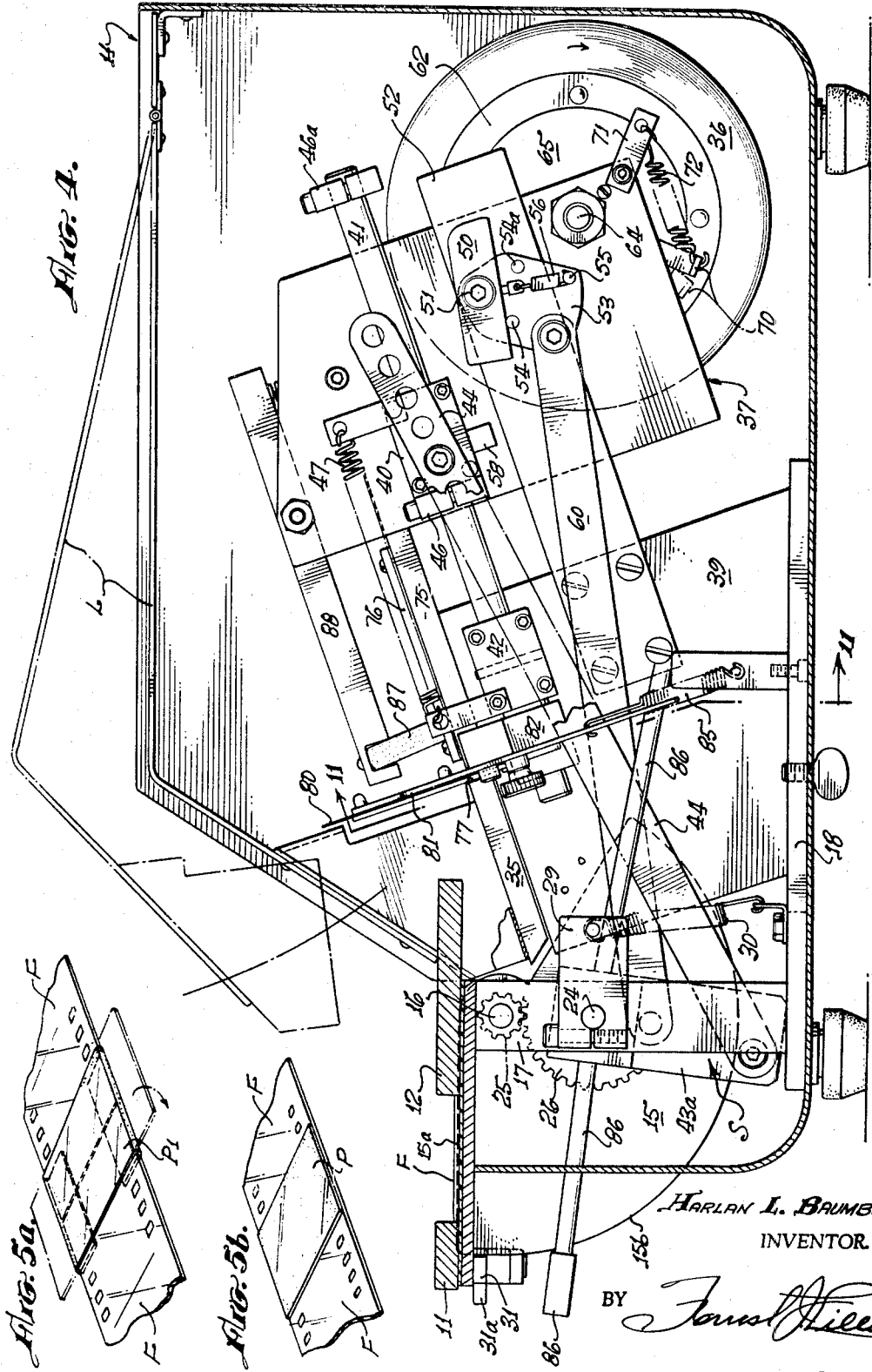

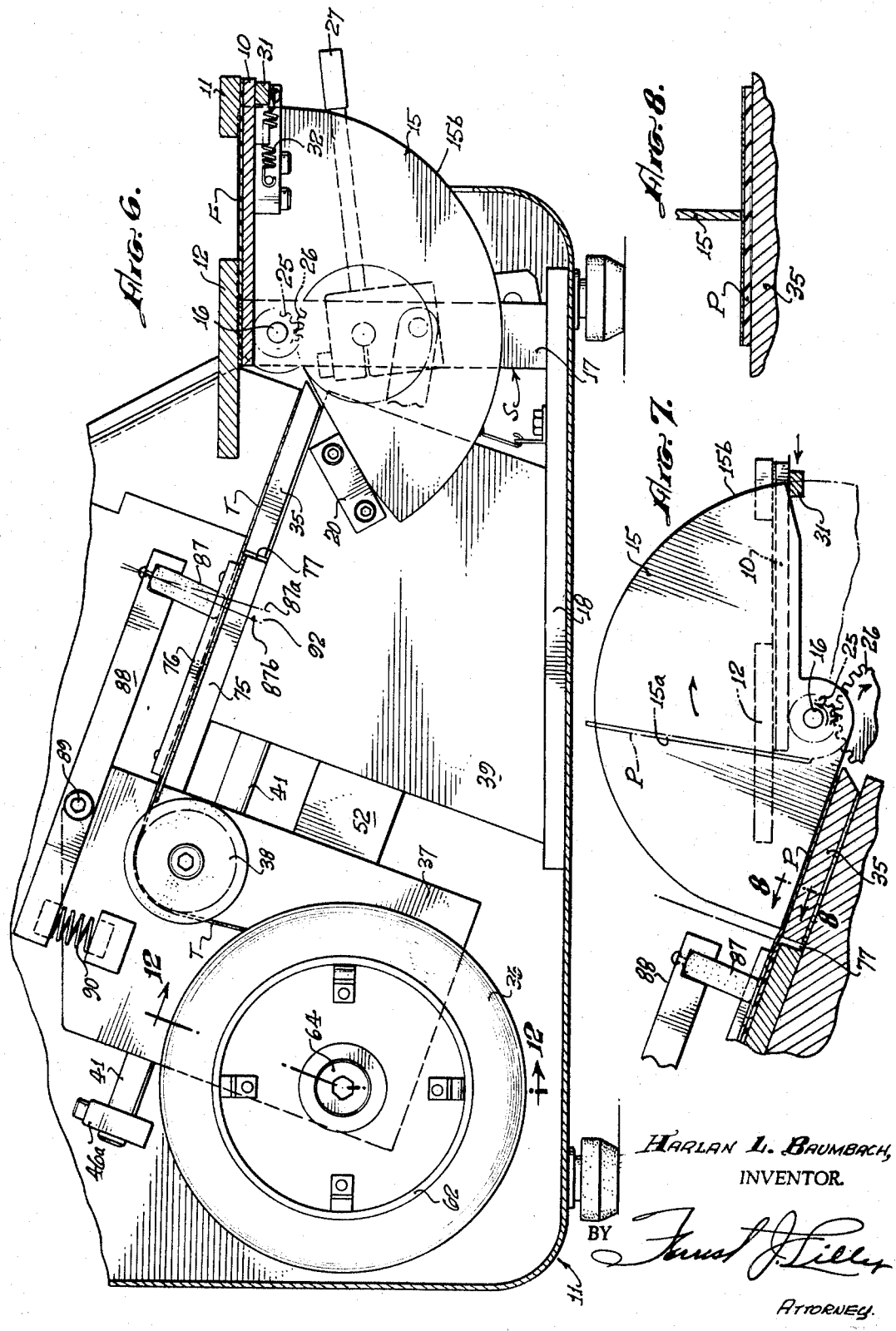

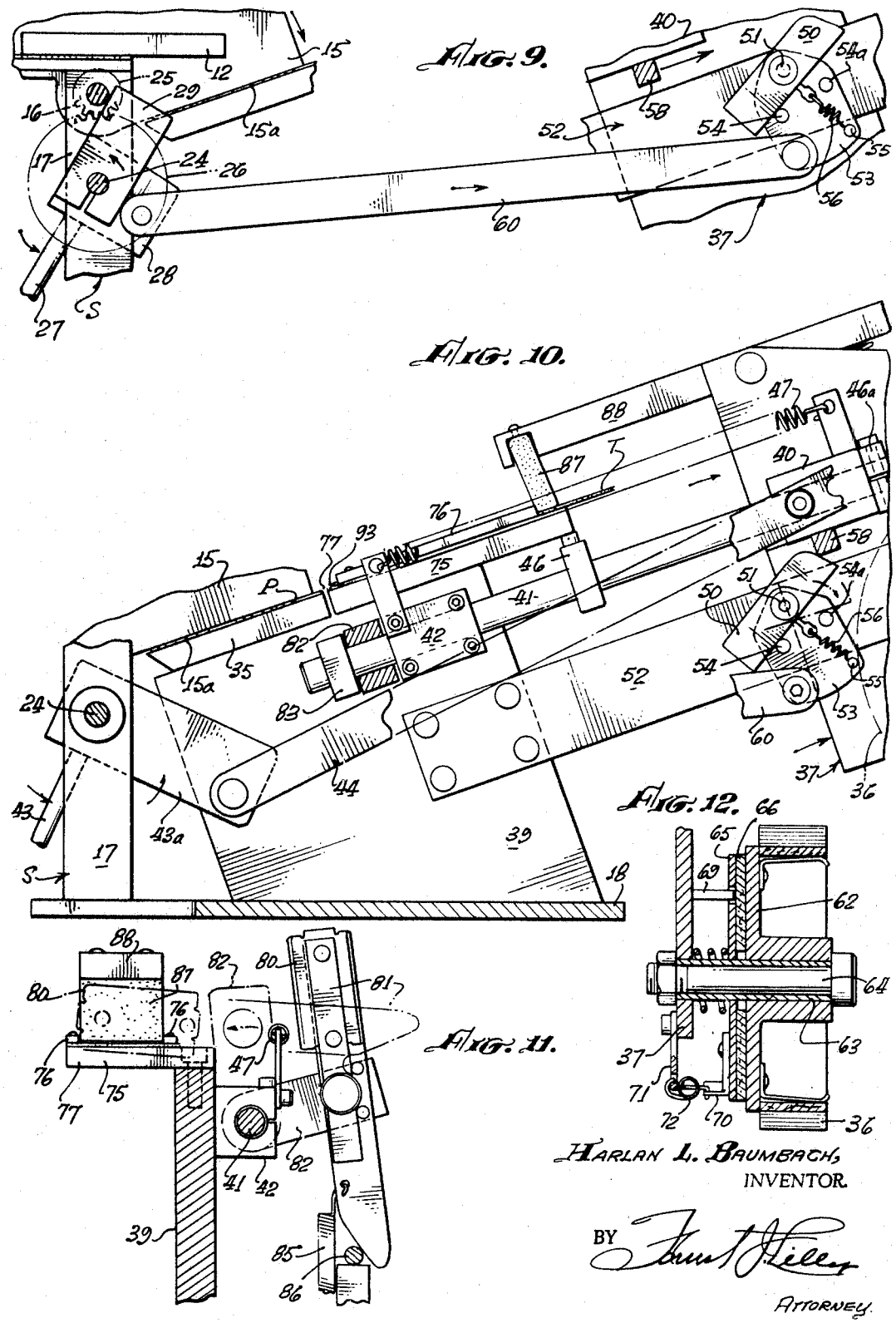

3,394,040
FILM SPLICER
Harlan L. Baumbach, 14332 Mulholland Drive,
Los Angeles, Calif. 90024
Filed Apr. 9, 1964, Ser. No. 358,461
18 Claims. (Cl. 156—505)

ABSTRACT OF THE DISCLOSURE

A splicer for strip materials, as film and the like, has a patch carrier that picks up a patch and carries it on to the strips to be joined. Operating levers to move the patch carrier, the knife, and the supply roll carriage to provide the next patch are all conveniently arranged adjacent the table holding the strips to be joined. This arrangement facilitates manipulation of the splicer and enables the operator to manually press the patch against the strips while still manipulating the levers.

The present invention relates generally to splicers for film strips and the like; and especially to devices for making splices of the butt type in contrast to an overlapping splice. Although the present invention is described and referred to as a splicer for motion picture film, it is to be realized that this is not limitative upon the invention since the dvice may be used to splice any type of thin, ribbon-like material, such as magnetic recording tape, paper tape, microfilm, and so on.

Previous devices for commercial use as film splicers have been, in many cases, complex and cumbersome machines that are relatively expensive to manufacture. Since a less expensive machine has obvious advantages and can be used in many applications were the inventment in a more expensive machine is not justified, it becomes an object of the present invention to provide a splicer of novel design that is simplified in construction and relatively less expense to build.

A typical and frequent use of splicing devices of the type herein described is in commercial film processing laboratories for joining together short lengths of film for processing in continuous equipment. This application of the splicer requires that many short lengths of film comprising only a relatively few frames be joined together in succession in order to form a long length which passes through continuously operating equipment. To be satisfactory for such use, the splicer must be completely reliable in operation and make a secure splice each time because if a splice fails for any reason, or is not complete at the instant required, the operator normally has no opportunity to correct this error. As a result, there can be substantial loss from damage to film in process.

Thus it is an object of the present invention to make a splicer capable of quick and easy operation without the necessity of closely observing visually its operation, enabling the operator to make a splice quickly under conditions of poor visibility, as in a darkroom.

It is also an object of the invention to provide a splicer of novel construction which is extremely reliable in operation and which permits the production of secure splices with a minimum of effect on the part of the operator.

A further object of the invention is to provide a splicer which is flexible in operation, thus adapting the splicer to any one of various widths of film or various kinds of materials of tapes, without any significant change in or departure from the basic design.

These and other objects of the present invention have been achieved by providing a splicer having a frame on which is a table for supporting in proper alignment two pieces of film or the like to be joined together, means supplying a length of adhesive coated splicing tape to a position adjacent said table with the adhesive side of the tape facing upwardly, means for cutting off a terminal portion of said tape in order to form a patch of a predetermined size, and means engaging the adhesive side of the patch and transporting the patch onto the two pieces of film with the adhesive side of the patch facing downwardly into contact with the film sections to be joined. The patch transport means comprises a rotatably mounted plate-like member moving in the space between two sections of the film supporting table and carrying the patch by contact with the adhesive material thereon with one edge of the carrier.

In order to supply the splicing tape, a supply roll is mounted on a carriage which, in turn, is mounted on the frame for reciprocation toward and away from the film supporting table and also the cutting table, which latter table is located at one side of the film supporting table. As the carriage with the supply roll moves away from the cutting table, a suitable length of tape is unwound from the supply roll; and as the carriage returns toward the cutting table, the terminal portion of the unwound tape is advanced over the table into cutting position. A knife means is movable across the path of the tape to sever the terminal portion and thereby form a patch of predetemined size which can then be picked up by the patch carrier, as mentioned above.

For convenience, the successive motions of the elements of the splicer are controlled by a series of control levers which are conveniently arranged side-by-side at the front of the machine, i.e., the side ordinarily facing the operator, where the operator can conveniently manipulate these control levers.

How the above objects of the invention are achieved, as well as others not particularly referred to herein, will be more readily understood by reference to the following description and to the annexed drawing, in which:

FIG. 1 is a perspective view of a film splicer embodying the present invention within a protective housing;

FIG. 2 is an enlarged front elevation of the film splicer with portions of the housing broken away to show the splicer within the housing;

FIG. 3 is a fragmentary plan view of the film supporting table and its guides with the patch carrier in its rest position;

FIG. 4 is a combined section and side elevation of the splicer taken on line 4—4 of FIG. 2, the entire side wall of the housing being broken away;

FIGS. 5a and 5b are perspective views illustrating different sizes of patches;

FIG. 6 is a combined section and side elevation of the splicer taken on line 6—6 of FIG. 2;

FIG. 7 is a fragmentary vertical section in the plane of FIG. 6 showing the patch carrier in the advanced or pickup position;

FIG. 8 is a fragmentary enlarged section onr line 8—8 of FIG. 7;

FIG. 9 is a fragmentary combined elevation and vertical section showing the linkage and the latch for holding the carriage in advanced position;

FIG. 10 is a fragmentary combined elevation and vertical section illustrating the linkage for reciprocating the carriage with the carriage in advanced position;

FIG. 11 is a fragmentary section on line 11—11 of FIG. 4 illustrating the knife means for severing the patch from the tape and the movement thereof for this purpose; and FIG. 12 is a fragmentary section through the supply roll and its mounting means, on line 12—12 of FIG. 6.

Referring now to the drawings, there is shown in FIG. 1 a splicer embodying the present invention which is substantially enclosed by housing H having a hinged lid L but which leaves exposed film table 10 and the manual controls located beneath the table, as will be explained later. The housing may be omitted if desired. Film table 10 is a flat plate which has an upper surface that is flat and disposed horizontally, or substantially so. As may be seen in FIG. 3, two sections of film F are laid down on top of the table in order to receive the splicing patch P. The two film sections are positioned on the table in end-to-end relation but with the ends slightly spaced apart, as will become apparent. The film sections are aligned with each other by engagement with parallel, spaced guides 11 and 12, one pair of guides 11 and 12 engaging opposite edges of each of the two sections F. Guides 11 and 12 are fastened in adjusted positions by machine screws 14 to accommodate film or tapes of different widths.

The splicing patch P is applied to the upper face of film sections F by patch carrier 15 which is a thin, plate-like member generally resembling a semi-circular disc, although from the following description, it will be apparent that the carrier is not limited to the exact shape illustrated. The disc is seen in side elevation in FIGS. 6 and 7.

Patch carrier 15 is rotatably mounted by affixing it to horizontally extending shaft 16 in any suitable manner. Shaft 16 is journaled to turn in bearings provided in a pair of spaced upright posts 17 which also form a part of the supporting structure for table 10 and which are attached at their lower ends to base plate 18. These posts, along with base plate 18 and other members mentioned below, are a part of the frame, indicated generally at S, constituting the supporting structure for the component parts of the splicer. By rotating shaft 16, patch carrier 15 is moved from the first or rest position of FIG. 6 to the advanced or pickup position of FIG. 7. It will be seen from FIG. 6 that in the first position, carrier 15 is substantially below the level of the top surface of table 10, while in the position of FIG. 7, a portion of the disc at least is above the top surface of the table.

Carrier 15 has a linear edge 15a which extends outwardly of the carrier from a point near the center but which is not truly radial since the axis of rotation established by shaft 16 is parallel to and below table 10 while it is desired that linear edge 15a substantially coincide with the top surface of table 10 when the disc is in the position of FIG. 6. In order to establish this position of the carrier, stop 20 is located in a position to be engaged by the disc and limit its rotation to the desired position.

Film table 10 is divided transversely into two sections which are spaced apart sufficiently for carrier 15 to move freely between them. Thus, while one section of the table is supported on the two posts 17, a second pair of posts 21 is provided in order to support the other table section.

In order to rotate shaft 16 and the carrier attached to it, there is provided a second shaft 24 also journaled in posts 17. A pair of intermeshing spur gears 25 and 26 are non-rotatively secured to shafts 16 and 24, respectively, the diameter of the gears being such that angular movement of shaft 24 produces a larger angular movement of shaft 16. Shaft 24 is oscillated by operating lever 27, which is one of three operating levers that extend forwardly to the front of the splicer, as shown in FIG. 1. Lever 27 is non-rotatably attached to shaft 24 in any suitable way, as by a split clamp formed in block 28. Depressing the outer end of lever 27 from the position shown in FIG. 1 rotates shaft 16 and patch carrier 15 counterclockwise as viewed in FIG. 6 from the position of that figure to the position of FIG. 7.

Carrier 15 is spring-biased to the rest position of FIG. 6. This is accomplished by connecting return spring 30 between base plate 18 and a short lever arm 29 which is attached to shaft 24 to rotate therewith. As carrier 15 is rotated to the pickup position, spring 30 is loaded and tends to return the carrier to its starting position; but for reasons which will become apparent, it is desirable to hold the carrier in the advanced position. This is accomplished by latch 31 pivotally mounted on the underside of table 10 and adapted to ride against the curved peripheral edge 15b of the carrier. This engagement holds the latch out until the carrier is in the advanced position, at which time the latch is pulled under an outwardly extending edge of the carrier by spring 32, as shown in FIG. 7, to hold the carrier in the advanced position.

In this advanced position, the carrier engages the end of a length of splicing tape which is resting on cutting table 35 disposed at one side of film table 10. The top surface of table 35 is flat and is so disposed that it is parallel with linear edge 15a of the carrier. The tape is advanced onto the cutting table from a supply roll 36 mounted on carriage 37. Carriage 37 is mounted on frame S for reciprocation toward and away from cutting table 35 and film table 10.

Carriage 37 is a plate carrying on one side supply roll 36 and idler 38 over which the splicing tape T passes after it is unwound from the supply roll. On the other side of carriage 37, shown in FIG. 4, there is attached slide bearing 40 which surrounds and is slidable along cylindrical guide 41 that is attached to the frame by means of mounting block 42. Block 42 is attached to the central upright pedestal 39 constituting a part of the structural frame S and attached rigidly to base plate 18.

Reciprocation of the carriage along rod 41 is accomplished by operating lever 43 which is one arm of a bell crank which rocks about shaft 24. The other arm 43a of this bell crank arrangement is pivotally connected to one end of operating link 44 which is pivotally connected at its other end to bearing block 40 on the carriage. It is preferable to drill a plurality of holes in the latter end of link 44 in order to provide adjustability of the point of connection between the link and block 40 which enables operating lever 43 to always start from approximately the same initial position for various lengths of travel of the carriage. The travel of carriage 37 is determined by the location of stops 46 and 46a on guide rod 41, the stops being typical split clamps which can be moved to any desired position along rod 41 and then tightened to hold them in place.

Carriage 37 is spring-biased toward the retracted or rest position of FIG. 4 by tension spring 47. Spring 47 is connected at one end to stationary block 42 and at the other end to traveling bearing block 40. Tension in spring 47 normally urges block 40 and carriage 37 against adjustable stop 46, as in FIG. 4.

Movement of the carriage outwardly along rod 41 loads spring 47, increasing its pull on the carriage. This outward movement of the carriage is accomplished by depressing handle 43, thus moving arm 43a of the bell crank arrangement counterclockwise around shaft 24, when viewed in FIG. 4. Link 44 then pushes the carriage outwardly along guide rod 41, travel in this direction being ultimately limited by stop 46a, though the normal operating stroke may end short of stop 46a. At the end of the stroke, the parts occupy their positions shown in FIG. 10 with the carriage in the advanced position.

In order to hold the carriage in the advanced position, releasable latch means are provided. This latch means includes detent 50 pivotally mounted at 51 on stationary arm 52 which is a part of the structural frame. Also swingingly mounted at 51 is control plate 53 which carries a pair of spaced stop pins 54 and 54a which by engagement with detent 50 limit its motion about pivot 51. Control plate 53 also carries a fixed pin 55 to which is connected one end of tension spring 56, the other end of the spring being attached to detent 50 in order to yieldingly bias detent 50 into a position which is determined by the position of control plate 53.

Detent 50 cooperates with stop 58 located on the underside of bearing block 40; but in the position shown in FIG. 4, detent 50 is swung out of range of engagement with stop 58. Detent 50 is moved by link 60 into the holding position in which it engages stop pin 58 to hold the carriage in its advanced position, the position shown in FIG. 10. Link 60 is connected at one end to plate 53 and at the other end to clamp 28 which serves as a lever that connects the link operationally to operating handle 27. Thus when operating lever 27 is depressed to the full line position in FIG. 9, block 28 rotates around shaft 24 and pushes link 60 outwardly. This swings control plate 53 around pivot 51. Detent 50 moves with the control plate, raising the forward end as shown in FIG. 9.

It will be realized that because of the connection through link 60, the carriage latch means including detent 50 is moved to the holding position at the same time that the patch carrier is moved into the pickup position. In this latter position, detent 50 can be depressed in a clockwise direction by stop 58 as it moves outwardly to the right in FIG. 9. However, when stop 58 has passed the detent, as in FIG. 10, the detent is raised behind the stop by the action of spring 56. The pressure of stop 58 on detent 50 now rocks the detent into engagement with stop pin 54, preventing the detent from further movement about its pivotal mounting. Thus the carriage is held in the advanced position by the latch.

The latch is released by rearward movement of connecting link 60, under conditions which will be explained later, this movement of the connecting link allowing control plate 53 to swing from the position of FIG. 10 back to the position of FIG. 4. Movement of the control plate is accompanied by swinging movement of detent 50 around pivot 51 which allows stop 58 to slide over the top of the detent, freeing the carriage for return movement to the position of FIG. 4 under the influence of spring 47.

The purpose of the reciprocating movement of carriage 37 is to unwind tape from roll 36 and then to position the end of the unwound tape for forming a splicing patch. As part of the means to accomplish this objective, the supply roll 36 is mounted rotatably upon the carriage by means which provides a friction drag or brake upon the roll of tape. For this latter purpose, tape roll 36 is mounted upon drum 62 which, in turn, is mounted on sleeve 63 surrounding bolt 64 that is an axle or spindle for rotatably supporting the drum and the tape roll thereon. The friction drag consists of disc 65 carrying a face pad of fritcion material 66 between it and the opposing face of drum 62. Disc 65 is pressed against the drum by spring 68 which bears at one end against disc 65 and at the other end against carriage 37. Rotation of disc 65 with respect to carriage 37 is limited by pin 69 attached to the carriage and projecting into an opening 65a in disc 65. Pin 69 limits relative movement of the disc in at least one direction, largely as a safety measure since, as will be explained, angular movement of disc 65 may be more limited.

As part of the tape supply mechanism, the purpose of which will become apparent, arm 70 projects laterally from disc 65 far enough to engage an edge of carriage 37 and thus limit rotation of disc 65 in a clockwise direction as viewed in FIG. 4. Between the outer end of arm 70 and the end of a sceond arm 71, which is rigidly fastened to carriage 37, is connected tension spring 72. The tension in spring 72 is in a direction to bias arm 70 away from carriage 37, tending to move disc 65 in a counterclockwise direction as viewed in FIG. 4.

The tape T unwound from roll 36 passes over idler 38 and then is directed onto cutting table 35 by a guide mechanism illustrated in FIGS. 6 and 10. This guide comprises a platform 75 having an upper planar surface over which the tape passes between a pair of parallel, transversely spaced guide rails 76. The planar top surface of platform 75 is parallel to but spaced slightly above the planar top surface of cutting table 35 in order that the free cut end of tape T passes smoothly off the platform onto the cutting table and does not drop down into the knife receiving space at 77 between the cutting table and platform 75.

It will be observed from FIG. 6 that, as the tape is unwound from roll 36 and passes over idler 38, it is turned with the adhesive coated side facing upwardly as it passes between guides 76. The tape is in this same position as it is advanced onto cutting table 35. Consequently the linear edge 15a of the patch carrier engages the tape on the adhesive side and patch P adheres to the carrier. The tape is assumed to be coated with a pressure-sensitive adhesive; and many features of the splicer are designed to take advantage of this fact. However, the splicer is not limited to pressure-sensitive tape. For example, a heat sealing tape could be used, in which case carrier disc 15 would be heated to adhere to the tape.

The top surface of platform 75 is preferably covered with a thin sheet of a material providing a smooth surface to which the adhesive has little tendency to adhere. A very suitable material for this purpose is the tetrafluoroethylene plastic commonly known as "Teflon"; although any other suitable material may be used.

A patch P is formed from the terminal portion of the unwound length of tape T by cutting off the tape along one edge of cutting table 35. Severing the tape is accomplished by a pivotally mounted knife blade shown in FIG. 11. Blade 80, which may be a razor blade, is mounted in a holder 81 which is rigidly connected to swinging arm 82 that pivots about guide rod 41. Arm 82 is held in position on guide rod 41 between fixed clamp 42 and collar 83. The knife and its holder are normally biased away from the tape to the position shown in FIG. 11 by a tension spring 85, one end of which is connected to the knife holder and the other end of which is connected to a suitable portion of the structural frame S.

Knife 80 can be rotated about the axis established by guide rod 41 by lifting the outer end of knife holder 81. This is accomplished by operating lever 86 which is pivotally mounted intermediate its ends on transverse shaft 24. As may be seen in FIG. 1, the forward end of operating lever 86 projects outside of housing H at a position underneath the film table 10 where it is closely adjacent the other two operating levers 27 and 43. Depressing lever 86 raises the other end of the lever which engages one end of blade holder 81, raising the blade holder and causing the blade and holder to swing around the guide rod to the broken line position of FIG. 11. Thereby the cutting edge of blade 80 is moved across the path of the tape as it travels from guide platform 75 onto cutting table 35. For this reason, platform 75 is spaced from the cutting table to form a gap at 77 that receives the knife blade. Lever 86 is operated manually; and as soon as the operator releases the pressure on the outer end of the lever, spring 85 returns the knife blade and its carrier to the inoperative or rest position shown in full lines in FIG. 11.

When the terminal portion of the tape is severed to form a patch P, the tape is preferably held taut across gap 77. This is done by two members. One of them is carrier 15 pressing downwardly on the tape on cutting table 35. The other one is hold-down 87 which is loosely mounted on one end of arm 88. Arm 88 is pivotally mounted intermediate its ends at 89 on carriage 37; and on the side of pivot 89 removed from block 87 there is located compression spring 90 which bears against arm 88 and against an abutment on carriage 37. The force of spring 90 is in a direction to cause block 87 to bear down on the upper side of tape T resting on platform 75.

Since the adhesive side of the tape is facing upwardly, pressure-sensitive adhesive on the tape comes into contact with block 87. In order to limit the adhesion between block 87 and the tape to a suitably low value the block is made of "Teflon"; although any other material having only a limited degree of adhesion with the tape may be used instead.

Having described the construction of a splicer embodying the present invention, its operation will now be described, particular attention being paid to the sequence of operation of the various component parts. As a starting condition, it may be assumed that the parts are in the positions shown in FIGS. 4 and 6 which are the rest or normal positions of the various assemblies. Thus, carriage 37 and the parts thereon are retracted under the influence of spring 47 and patch carrier 15 is urged by spring 30 to a position substantially below film table 10 and with its linear edge 15a substantially in alignment with the top surface of the table. At the starting position, the three operating levers 27, 43 and 86 are all raised and preferably are at more or less the same level under film table 10. It will be seen from the following explanation that the levers are side-by-side for maximum convenience of access and manipulation by the operator.

It may be assumed that some tape has been unwound from supply roll 36 and advanced over platform 75 to have resting on top of cutting table 35 a length of tape sufficient to form a patch of the desired size. In ordinary operation, the tape would not be advanced initially a measured distance onto the cutting table but rather the first random length of tape cut off would be discarded. Accordingly, for the purposes of disclosure, it may be assumed that the length of tape on the table is now of the proper size for the desired patch.

The first action of the operator is to depress lever 27. This motion is transmitted through gears 26 and 25 to shaft 16 and patch carrier 15, the patch carrier being rotated in a counterclockwise direction, as viewed in FIG. 6, from the position of that figure to the position of FIG. 7. In this position, the linear edge 15a of the carrier firmly engages the upwardly facing adhesive side of the tape resting on cutting table 35. The movement of lever 27 also stretches spring 30 which tends to reverse the motion of carrier 15; but this tendency is checked at the end of the stroke of the carrier by latch 31 which is moved under a radial edge of the carrier by spring 32. The surface engaged by latch 31 is preferably inclined somewhat to the direction of latch movement, as shown in FIG. 7, in order that the latch has a camming action against the carrier disc and there may be no backlash of the carrier. It is held by the latch firmly in engagement with the terminal portion of the tape resting, adhesive side up, on the cutting table.

The operation of the first lever 27 also acts to move the latch mechanism for holding the carriage into locking position. Movement of the lever is transmitted through connecting link 60 to latch control plate 53, thus swinging the plate from the position of FIG. 4 around pivot 51 to the position of FIG. 9. In this latter position, detent 50 is swung into such a position that its forward end is within the path of stop 58 on the carriage. Operation of lever 27 also raises disc 15 to a position in which it acts as a separator for the butt ends of the film pieces F.

The next action by the operator is to manually depress the outer end of the second operating lever 43 which advances carriage 37 through connecting link 44. As lever arm 43a moves counterclockwise in FIG. 4, carriage 37 and the parts mounted on it are moved from the position of FIG. 4 to the position of FIG. 10 against the pull of spring 47. At the end of the stroke, stop 58 carried by the carriage engages detent 50. The detent is held against rotation in a counterclockwise direction about pivot 51 by engagement with stop pin 54 so that the carriage is locked by the latch mechanism at the forward end of the carriage stroke in opposition to the pull on the carriage exerted by spring 47.

As the carriage is advanced, that is, moved away from film table 10 and cutting table 35, tape is unwound from roll 36. The free end of the tape resting on cutting table 35 is held firmly in position by engagement with carrier 15 pressing against the tape on the table. Movement of the carriage exerts a pull on the unwound length of tape which causes additional tape to be unwound from roll 36.

The starting point for forward movement of the carriage is determined by adjustable stop 46 and the length of the carriage travel is then determined by engagement of sliding block 40 with stop 46a near the outer end of guide rod 41. Normally the position of stop 46a remains relatively fixed and the net length of travel of the carriage is determined by adjusting stop 46. As will become evident, the amount of carriage travel determines the amount of tape unwound from the roll and this, in turn, determines the length of the patch cut off when the terminal portion of the tape is severed. Consequently the position of stop 46 is so located that a patch of the proper length is formed.

The pull on the tape rotates supply roll 36 clockwise relative to the carriage when viewed as in FIG. 4. This rotation of the tape roll about its supporting spindle is resisted by the drag effect of the friction pad at 66, the friction tending to turn disc 65 in the same direction as the roll. However, the angular movement of disc 65 is limited by engagement of projecting arm 70 with the underside of carriage 37, as shown by the dotted position in FIG. 4. When in the dotted position, the arm prevents further rotation of disc 65 but the roll of tape is able to continue to turn because of the slipping connection afforded through the friction drag arrangement. Such movement of arm 70 increases the tension in spring 72.

Hold-down block 87, resting on top of the tape in the guide, is purposely loose in its mounting in bar 88 so that the lower edge of the block can rock back and forth slightly as indicated by the angle 92 between the center lines 87a and 87b of its two extreme positions. At the end of advance movement of the carriage, the block is in the position indicated in FIG. 6.

With the parts of the splicer positioned as just described, the operator is now ready to sever the terminal portion of the unwound length of tape T and thereby provide a patch to be applied to two pieces of film. Severing the tape is accomplished by depressing the outer end of lever 86, which is the third of the three operating levers positioned beneath the film table. This rocks lever 86 about shaft 24, the inner end moving upwardly to raise blade holder 81. Blade holder 81 rocks about the axis established by guide rod 41, moving knife 80 through an arcuate path as indicated in FIG. 11 and cutting off that portion of the tape which rests upon cutting table 35. When the patch P is severed, the remainder of the tape is free from the restraint on it imposed by engagement with carrier 15. This allows the pull of spring 72 to return arm 70 on the supply roll mounting fixture from the dotted line position to the full line position of FIG. 4. The amount of this movement may be limited by the size of the opening in disc 65, a side of which engages fixed pin 69 on the carriage, though, as explained below, the movement is normally limited by other means to a smaller range. As a result pin 69 is largely a safety measure to avoid over-stretching spring 72. Very typically, the amount of movement of the tape roll is sufficient to produce a linear movement of the tape at the free end, just cut, of about 1/16 to 1/8 of an inch. The pull of spring 72 causes a slight reverse rotation of roll 36 which pulls back the free cut end of the tape from the edge of gap 77 to some such position as indicated at 93 in FIG. 10. This separation between the edge 93 and the patch resting on the cutting table has been found advantageous in order to avoid any interference with the patch which might strip it from the carrier during its subsequent movement.

The patch having been placed on table 35 as described, the patch is now ready for application to the two pieces of film F. Although these film pieces may be laid in place earlier, typically they are now placed on table 10 and butt to the position shown in FIG. 3. If not done previously, the ends of the film are now cut off squarely at right angles to the longitudinal sides. The two pieces of film are laid in end-to-end relation between the guides 11 and 12 with one piece of film at each side of the patch carrier which is still raised into the position of FIG. 7. Since a portion of the carrier now extends above the surface of film table 10, the two pieces of film are moved toward each other until their ends butt against the opposite sides of disc 15 which now serves as a means for locating the ends of the film in proper position for the application thereto of the patch which forms the splice.

The formation of the machine is such that the operator can conveniently hold one piece of film with each hand, while facing the splicer. While holding the two ends of the lengths of film on the table, he now pushes on the protruding portion 31a of latch 31, as indicated by arrow 94 in FIG. 3. This pressure, applied manually, rotates the latch in a clockwise direction, viewed from above, and disengages it from the lower edge of disc 15. The patch carrier now being free to move under the influence of spring 30, the carrier rotates through approximately a semi-circle in a clockwise direction as viewed in FIG. 7. The dotted line position of the carrier indicates a patch P adhering to edge 15a of the carrier being transported from table 35, where it rested with its adhesive side facing up, through approximately a semi-circle to be deposited upon the upper face of the two pieces of film on the film table. The movement inverts the patch so that it is deposited with its adhesive side downwardly, that is, against the two pieces of film. The pressure-sensitive tape adheres firmly to the edge of the moving carrier and is deposited on the film.

The patch is not necessarily applied to the film by the carrier with sufficient force to ensure a secure splice; but this is easily accomplished by the operator. In this position, he can press with his thumbs against the upper side of the patch, pressing it firmly into contact with the two pieces of film, thereby assuring a secure splice. Application of manual pressure to the patch to improve its adherence to the film is easily accomplished without displacement of the hands from the film at any time since the film pieces are being held on the table by the fingers with the hands in such position that the thumbs can apply the final pressure to the splice patch without at any time removing the hands from the film.

The return movement of patch carrier 15 under the influence of spring 30 is accompanied by a retraction of connecting link 60 and latch control plate 53. The latter movement is also induced by the pull of spring 30 and has the effect of swinging plate 53 from the locking position of FIG. 10 to the release position of FIG. 4 in which stop 58 on the carriage can ride over the top of detent 50. This frees carriage 37 for return movement which is performed by tension spring 47, the carriage being returned by the spring until bearing block 40 engages stop 46 as in FIG. 4.

This return movement of the carriage with the roll of tape advances the unrolled portion of the tape over guide 75, 76 onto cutting table 35. In order that the free end of the tape is not snagged on the near edge of the cutting table, it is preferable, as mentioned before, that the level of guide 75 be slightly above the plane of the top surface of the cutting table.

During advance of the carriage, hold-down block 87 is dragged over the surface of the tape which is held stationary on guide 75. The block adheres somewhat to the tape but "Teflon" limits adhesion to a suitably low value. The hold-down block is rocked about its connection to arm 88 by the frictional drag against the tape to bring its center line to the position 87a. When the patch P is cut off, the cut end of the tape is free of carrier 15 and reverse movement of the tape takes place under the pull of spring 72, as previously described, block 87 rocking through angle 92 to bring its center line to 87b (FIG. 10). The range of movement of the block at the tape is limitative on the tape travel since the block engages the sides of the notch in bar 88 before pin 69 engages disc 65 at 65a.

When detent 50 is released, the carriage returns to its normal position, advancing tape onto the cutting table. Adhesion with the tape causes the block to retain position 87a as it is moves with the tape during return travel of the carriage. The hold-down assists in advancing the tape over guide 75 and onto the cutting table to provide material for the next patch.

The return movement of the carriage is obviously equal to its advance movement. However, the length of tape deposited on the cutting table by the return movement of the carriage is equal to the length of tape unwound from the supply roll during the forward movement of the carriage, less a constant amount equal to the reverse travel of tape as spring 72 moves hold-down block 87 through the angle 92. This length of tape is adjusted by positioning stop 46 to provide a patch of the desired length.

In general, two types of patches can be conveniently applied. If the length of the tape forming patch P is exactly equivalent to the transverse width of the film pieces F, then the successively cut edges of the patch are flush with the longitudinal edges of the film and the splice produced appears as in FIG. 5b. This increases the thickness of the film at the splice by only a single thickness of tape. However, under some circumstances, it may be desired to have an overlapping splice of the character shown in FIG. 5a. In this case, the total length of the splicing patch $P_1$ is longer than the width of the film being patched. The patch is then deposited on the film, preferably centered on the film, the patch is pressed against the upper surface of the film, as before, and then after the film pieces are lifted off of the film table, the free ends of the patch are folded around and under the two pieces of film and pressed manually against the underside of the film. This results in a splice that is stronger than the flush type patch of FIG. 5b and is thicker than the latter splice by one thickness of the patching tape. Either of these splices or a variation of either one can be produced by adjusting the length of the patch cut with respect to the width of the film being spliced.

The cycle of operations is now complete. Under the influence of the various return springs, all of the parts have been restored to their initial starting positions as explained at the beginning of the description of the operation. The described cycle of operations is repeated for each patch applied.

From the foregoing description, it will be evident that various changes in the detailed construction, arrangement and operation of the various components constituting the splicer of the present invention may occur to persons skilled in the art without departing from the spirit and scope of the present invention. Accordingly, it is to be understood that the foregoing description is considered as being illustrative of, rather than limitative upon, the invention as defined by the appended claims.

I claim:

1. A splicer for a thin flat strip comprising, in combination:
   a frame;
   a table on the frame for supporting two pieces of strip to be joined;
   means supplying a length of adhesive coated splicing tape to a position adjacent said table with the adhesive side thereof facing up;
   means for cutting off a terminal portion of said tape to form a patch;
   and means engaging the adhesive side of the patch for transporting the patch onto the two pieces of strip with the adhesive side of the patch facing down.

2. A splicer for a thin flat strip as in claim 1 in which the table is divided transversely into two sections;
   and the means for transporting the patch moves between the two sections in a direction generally normal to the table surface supporting the strip.

3. A splicer for a thin flat strip as in claim 1 in which the table is divided transversely into two sections;

and the means for transporting the patch comprises a disc rotatably mounted on the frame to oscillate between the table sections about an axis substantially parallel to said table, said disc having an outwardly extending linear edge engageable with the patch and movable to a position substantially in alignment with the table surface supporting the disc.

4. A splicer for a thin flat strip as in claim 3 which also includes spring means urging the disc to the position with said linear edge in substantial alignment with the table surface;

manually actuated means for rotating the disc into an advanced position in contact with the patch;

and releasable latch means holding the disc in said advanced position against the force of said spring means.

5. A splicer for a thin flat strip as in claim 1 in which the table is divided transversely into two sections;

and the means for transporting the patch comprises a carrier member rotatably mounted on the frame and movable between a first position in which it is substantially below the table and a second position in which a portion of the carrier is above the table and provides a stop against which opposing ends of the two strip pieces on the table abut.

6. A splicer for a thin flat strip comprising, in combination:

a frame;

a table on the frame for supporting two pieces of film to be joined;

a cutting table adjacent said strip table at one side thereof;

means supplying a length of splicing tape onto said cutting table;

knife means movable across the path of the tape at one edge of the cutting table to sever a terminal portion of said tape and form a patch resting on the cutting table;

and means engaging the patch for transporting the patch onto the two pieces of strip with the adhesive side of the patch against the strip.

7. A splicer for a thin flat strip as in claim 6 in which the splicing tape is adhesive coated and is positioned on the cutting table adhesive side up;

and the patch transporting means engages the adhesive side of the patch to lift it off the cutting table.

8. A splicer for a thin flat strip as in claim 6 in which the means for supplying tape onto the cutting table includes a carriage mounted on the frame for reciprocation toward and away from the cutting table;

a supply roll of tape;

means rotatably mounting the roll on the carriage;

and means directing a length of tape from the roll onto the cutting table as the carriage moves toward the cutting table.

9. A splicer for a thin flat strip as in claim 8 in which the last-mentioned means includes a guide having a planar surface parallel to and slightly above the planar surface of the cutting table.

10. A splicer for a thin flat strip as in claim 6 in which the means for supplying tape onto the cutting table includes a carriage mounted on the frame for reciprocation toward and away from the cutting table;

a supply roll of tape on the carriage;

means for unwinding tape from the roll as the carriage moves away from the cutting table;

and means for advancing a length of unwound tape onto the cutting table as the carriage moves toward the cutting table.

11. A splicer for a thin flat strip as in claim 10 which also includes spring means normally urging the carriage toward the cutting table;

means for moving the carriage away from the cutting table against said spring;

and latch means holding the carriage near the end of its travel away from the cutting table and releasable to permit return movement of the carriage by said spring means.

12. A splicer for a thin flat strip comprising, in combination:

a frame;

a table on the frame for supporting two pieces of strip to be joined;

a cutting table adjacent said strip table at one side thereof;

a carriage mounted on the frame for reciprocation toward and away from the cutting table and carrying a supply roll of splicing tape;

means for unwinding tape from the roll and directing tape onto the cutting table, the length of tape on said table being determined by movement of the carriage toward the cutting table;

knife means movable across the path of tape directed onto the table to sever a terminal portion of the tape on the cutting table to form a splicing patch;

and adjustable stop means controlling the range of carriage travel, whereby the length of patch cut is controlled.

13. A splicer for a thin flat strip comprising, in combination:

a frame;

a table on the frame for supporting two pieces of strip to be joined;

means for supplying a splicing patch to a position adjacent said table, including a carriage mounted on the frame for movement toward and away from said table and carrying a supply roll of splicing tape;

means for transporting the patch from said position onto the pieces of strip, including a movable patch carrier and means for advancing said carrier into engagement with the patch;

spring means normally urging the carriage toward the table;

releasable latch means locking the carriage in a predetermined position at the end of the carriage travel away from the table;

means interconnecting said latch means and said means for advancing said carrier, whereby the latch means is operated in response to and in timed relation to movement of the patch carrier; and means for moving the carriage away from the table in opposition to said spring means and unrolling the supply roll during said movement away from the table.

14. A splicer for a thin flat strip comprising, in combination:

a frame;

a table on the frame for supporting two pieces of strip to be joined;

means for supplying a splicing patch to a position adjacent said table, including a carriage biased toward a first position, manually operated means to move the carriage to a second position, and releasable latch means holding the carriage in the second position;

means for transporting the patch from said position adjacent the table onto the strip, including a movable patch carrier biased toward a first position, manually operated means for moving the carrier to a second position in engagement with the patch, and a releasable latch holding the carrier in the second position;

and linkage interconnecting the latch means for the carriage and the means for moving the patch carrier, whereby the latch means for the carriage is operated in timed relation to movement of the patch carrier.

15. A splicer for a thin flat strip comprising, in combination:

a cutting table;

means supplying a length of splicing tape onto said cutting table, including a carriage movably mounted on the frame and means for rotatably mounting a supply roll of tape on the carriage;

knife means movable across the path of the tape at one edge of the cutting table to sever a terminal portion of said tape and form a patch resting on the cutting table;

and resilient means producing limited reverse rotation of the supply roll after the patch is severed thereby retracting the cut end of the tape from the patch after the patch is severed.

16. A splicer for a thin flat strip comprising, in combination:

a frame;

a table on the frame for supporting two pieces of strip to be joined;

a cutting table adjacent said strip table at one side thereof;

means supplying a length of splicing tape onto said cutting table, including a carriage movably mounted on the frame and means for rotatably mounting a supply roll of tape on the carriage;

said last-mentioned means including a friction drag on the tape roll;

knife means movable across the tape to sever a terminal portion thereof to form a patch resting on the cutting table; and means engaging the tape adjacent the knife means to allow limited reverse movement of the cut end of the tape away from the knife in response to reverse rotation of the supply roll.

17. A film splicer for a thin flat strip, comprising:

a stationary cutting table having a planar surface;

means supplying adhesive coated tape to said cutting table including a reciprocating carriage having means for rotatably mounting on the carriage a supply roll of tape, a stationary guide having a planar surface parallel to the surface of the cutting table directing tape onto the cutting table, means directing tape onto the guide adhesive side side up, and a hold-down member movable with the carriage and yieldingly pressing the tape against the guide by contact with the adhesive coated side of the tape;

and means for severing the tape at a position adjoining one edge of the cutting table to provide a splice patch resting on the cutting table.

18. A film splicer for a thin flat strip as in claim 17 in which the hold-down member is of a material having limited adhesion with the tape, whereby the adhesion is sufficient that the member advances the end of the tape when free onto the guide and slides over the tape when the end is held during reverse movement of the hold-down member.

References Cited

UNITED STATES PATENTS

| | | | |
|---|---|---|---|
| 1,383,726 | 7/1921 | Kiracofe | 156—304 |
| 1,907,742 | 5/1933 | Coleman | 83—282 |
| 2,441,821 | 5/1948 | Kendall | 156—505 |
| 3,050,107 | 8/1962 | Barry et al. | 156—517 |
| 3,167,466 | 1/1965 | Lapersonne | 156—505 |

DOUGLAS J. DRUMMOND, *Primary Examiner.*